US007920829B2

(12) United States Patent
Gilbertas et al.

(10) Patent No.: US 7,920,829 B2
(45) Date of Patent: Apr. 5, 2011

(54) METHOD AND SYSTEM FOR LOCALLY CONTROLLING THE DISTRIBUTION OF AN APPLICATION ON A SHARED WIRELESS NETWORK

(75) Inventors: Claire Gilbertas, Betton (FR); Sabrina Venant-Valery, Vern sur Seiche (FR); Michel Jean, Rennes (FR)

(73) Assignee: France Telecom, Paris (FR)

( * ) Notice: Subject to any disclaimer, the term of this patent is extended or adjusted under 35 U.S.C. 154(b) by 789 days.

(21) Appl. No.: 11/883,897

(22) PCT Filed: Feb. 2, 2006

(86) PCT No.: PCT/FR2006/000239
§ 371 (c)(1),
(2), (4) Date: Dec. 5, 2007

(87) PCT Pub. No.: WO2006/082320
PCT Pub. Date: Aug. 10, 2006

(65) Prior Publication Data
US 2008/0153422 A1  Jun. 26, 2008

(30) Foreign Application Priority Data
Feb. 7, 2005 (FR) .................................. 05 01200

(51) Int. Cl.
*H04B 17/00* (2006.01)
(52) U.S. Cl. ........ 455/67.11; 455/424; 455/9; 455/11.1; 370/327; 370/328; 370/338
(58) Field of Classification Search .................. 455/424, 455/9, 11.1, 13.1, 67.11; 370/327, 328, 338, 370/340, 351, 352
See application file for complete search history.

(56) References Cited

U.S. PATENT DOCUMENTS

| 7,269,444 B2 * | 9/2007 | Mori .............................. 455/557 |
| 2006/0029089 A1 * | 2/2006 | Zellner et al. .................. 370/412 |
| 2008/0037578 A1 * | 2/2008 | Carlson et al. ................. 370/463 |

FOREIGN PATENT DOCUMENTS
WO   WO 03/007115 A2   1/2003

OTHER PUBLICATIONS

Garg et al., "Wireless access server for quality of service and location based access control in 802.11 networks," Computer and Communications, 2002. Proceedings. ISCC 2002, Seventh International Symposium on, Jul. 1-2, 2002, Piscataway, NJ, USA, IEEE, pp. 819-824 (Jul. 1, 2002).

* cited by examiner

*Primary Examiner* — Tuan A Pham
(74) *Attorney, Agent, or Firm* — Drinker Biddle & Reath LLP

(57) ABSTRACT

A method and system are provided for locally controlling the distribution of an application at an access point to a shared wireless network and of an application to a mobile node which is located using the address thereof. According to the present method and system, for the access point, the data rate per type of application is measured, the charge rate of the access point per type of application is calculated from the access point and the distribution of a novel application at said access point is either authorized or refused according to the internal priority rules associated with each application following any request for the distribution of said novel application. The present method and system are suitable for the management of access points to an IEEE P802.11-type shared wireless network.

13 Claims, 4 Drawing Sheets

METHOD AND SYSTEM FOR LOCALLY CONTROLLING THE DISTRIBUTION OF AN APPLICATION ON A SHARED WIRELESS NETWORK

CROSS-REFERENCE TO RELATED APPLICATIONS

This application is the U.S. national phase of the International Patent Application No. PCT/FR2006/000239 filed Feb. 2, 2006, which claims the benefit of French Application No. 05 01200 filed Feb. 7, 2005, the entire content of which is incorporated herein by reference.

The invention relates to a method and a system for locally controlling the broadcasting (distribution) of an application on a shared wireless network, or of a service provided by this application, at the level of an access point of this network by one or more mobile nodes or mobile terminals.

BACKGROUND OF THE INVENTION

At the present time, the radio information made available to application servers, or to services provided by these applications, by the entities of a shared wireless network such as access point, mobile node, access router, is essentially provided by radio measurements which make it possible to ascertain:
  the radio occupancy rate of an access point, all applications or services taken together,
  the connected mobile nodes and the data transmission throughputs that the latter use.

The aforesaid information does not however make it possible to discriminate the data transmission throughputs used by each type of application or service traveling through an access point.

Furthermore, this information is uploaded at the core network level for exploitation or use in conjunction with information specific to the mobile nodes, such as subscription, alternative list of access networks or the like. It is therefore not directly usable by the local equipment.

For a more detailed description of processes for uploading information to a core network, reference may usefully be made to the documents hereinbelow of the prior art:
  WO 03/047296 filed as published on Jan. 5, 2003 in the name of France Telecom, which describes a mobility manager for mobile terminals or nodes, making it possible to initiate and guide the execution of an intercell transfer protocol, designated "handower" in English, on the basis of information transmitted by the operator, the network and the mobile nodes. The aforesaid mobility manager is placed in a cellular network and makes it possible to choose target cells as a function of the radio data measured and uploaded by the mobile nodes, the network data, such as each type of traffic, quality of service and operator data, relating to usage, such as subscriber profiles, network parameters, triggering thresholds, operating state of the access points;
  IEEE P802.11k/D1.0 entitled Radio Resource Measurement, published in July 2004, describes the use of level 2 information, relating to the medium access control, MAC (Medium Access Control) information and available at the mobile node and at the access point.

Finally, a mode and a module for calculating the occupancy rate or load of a network have formed the subject of the aforesaid standardization text IEEE P802.11K/D1.0. This mode of calculation and this module underly numerous applications relating to the mobility of mobile nodes and the choice of access point during connection of one of them.

SUMMARY OF THE INVENTION

The present invention is the fruit of a substantially different approach to the earlier developments.

Its chief objective is to allow the implementation of management policies by a method for locally controlling the broadcasting of applications permitting the consideration, in the decisional algorithms of the media for implementing these processes, of at least the information hereinbelow relating to shared wireless networks:
  the occupancy rate of the access points per type of application or of service broadcast or distributed, in particular the data transmission throughputs implemented by each type of application;
  the fine location, at the access point level, of each mobile node, on the basis of its network address, by one-to-one mapping between a network address of the mobile node, such as the IP address of the latter, and the network address, for example the IP address, or the MAC address, of the access point.

Thus, on the basis of just the local information and entirely independently as regards the core network, the present invention is aimed at allowing control of the acceptance or denial of the broadcasting of any application or service, as a function of the types of application or service already broadcast by a determined access point.

For example, the present invention can allow acceptance of the broadcasting of an application or service, even if the access node of the requesting mobile node is heavily loaded, when the types of application or service which simultaneously travel through the latter are capable of supporting a reduction in transmission throughput.

The method for locally controlling the broadcasting of an application at the level of an access point of a shared wireless network, which is the subject of the present invention, to which is connected at least one mobile node, tagged by a network address, is noteworthy in that it consists in, for said access point, measuring the throughput of data transmitted per type of application, calculating the load rate of this access point per type of application, on the basis of at least the average throughput used between this access point and this mobile node, permitting respectively denying, on the basis of priority rules associated with each type of application, as a function of the load rate of this access point, for any request for broadcasting a new application, the broadcasting of this new application on this access point.

The system for locally controlling the broadcasting of an application at the level of an access point of a shared wireless network, to which is connected at least one mobile node, tagged by a network address, which is the subject of the invention, is such that this network comprises an applications server making it possible to broadcast a plurality of applications invoked on request by a mobile node. Each access point is interconnected to the core network of the network and to the applications server.

It is noteworthy in that it comprises at least, interconnected to this applications server and to these access points, an applications database, containing a set of data relating to these applications and to these access points, a module for calculating, for this access point, the load rate per application, interconnected to the applications database, this module for calculating the load rate per application allowing the collection and the transmission of data relating to the applications and the updating of this database on the basis of the latter, a module for controlling, for this access point, the broadcasting of the requested application, in conjunction with the applications server, and making it possible to ensure the control of broadcasting, by permission respectively denial, on the basis of priority rules associated with each type of application, as a function of the load rate of this access point, for any request for broadcasting a new application.

BRIEF DESCRIPTION OF THE DRAWINGS

FIG. 3b represents, by way of illustration, the succession of the steps of transmission between the constituent elements of the system which is the subject of the present invention such as represented in FIG. 3a.

DESCRIPTION OF PREFERRED EMBODIMENTS

A more detailed description of the method for locally controlling the broadcasting of an application at the level of a local access point of a shared wireless network in accordance with the subject of the present invention will now be given in conjunction with FIG. 1 and the following figures.

In a general manner, consideration is given to one or more mobile nodes $NM_i$ connected to a network, such as the IP network for example, by way of an access point of a shared wireless network. Shared wireless networks have formed the subject of an IEEE 802.11 standardization text. The aforesaid access point is denoted $PA_j$ and is for example tagged by its MAC address, as previously mentioned in the description.

Each type of application able to be broadcast to any mobile node $NM_i$ by way of the access point $PA_j$ is denoted $A_k$.

Figure 1:
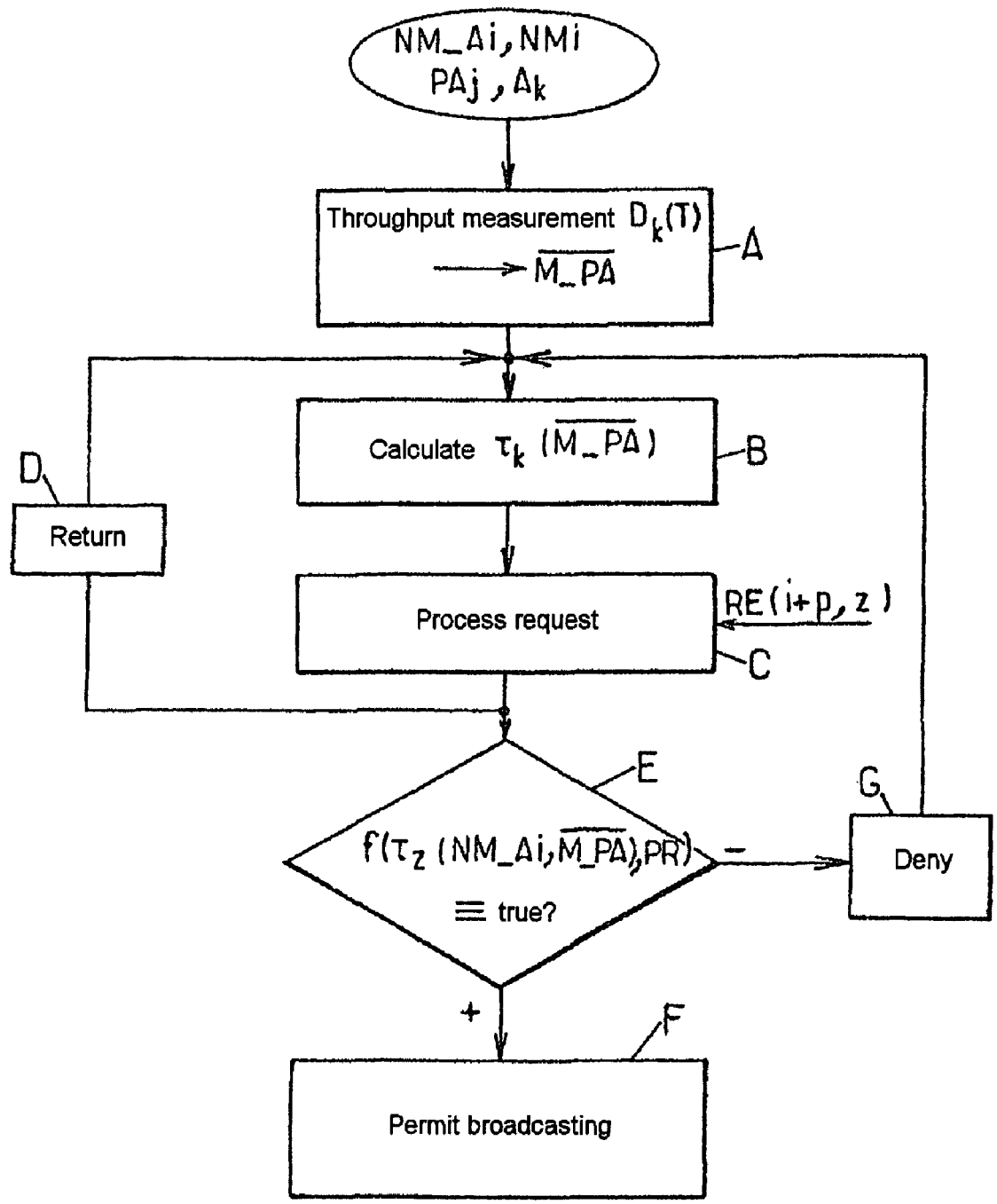
FIG. 1 represents, by way of illustration, a flowchart of the essential steps for implementing the method which is the subject of the invention.

With reference to FIG. 1, it is indicated that the method which is the subject of the invention consists in executing a step A consisting in measuring the throughput of the data transmitted by the aforesaid type of application $A_k$. The aforesaid operation makes it possible to evaluate the average throughput used between the access point $PA_j$ and each of the mobile nodes $NM_i$ this average throughput being denoted $\overline{M\_PA}$.

The operation A is followed by an operation B consisting in calculating the load rate of the access point $PA_j$ per type of application on the basis of at least the network address of the mobile node and of the average throughput used between the access point and the aforesaid mobile node.

In FIG. 1, the load rate of the access point per type of application is denoted:

$$\tau_k(\overline{M\_PA})$$

In the annotation relating to the load rate of the aforesaid access point, $A_k$ designates the reference to the type of application considered.

Step B is then followed, for example, by a standby step C awaiting receipt of a request for broadcasting a new application at the level of the access point $PA_j$, this request being denoted $RE(i+p,z)$, z designating a reference of an application belonging to one of the types of application $A_k$.

In the annotation relating to the aforesaid request, i+p designates the arbitrary address of a mobile node $NM_{i+p}$ and z designates the index of a new application requested by the mobile node $NM_{i+p}$.

The request asking for broadcasting of a new application can then be processed in a conventional manner by verifying authorization for connection of the mobile node $NM_{i+p}$ to the access point $PA_j$. This authorization process will not be described in detail since it corresponds to a process known in the state of the art.

Step C is then followed by a step D of return to the calculation of the load rate of the access point $PA_j$ in step B, having regard to the request for broadcasting the new application. The return step is represented by step D Return, taking into account the request for the new application.

After calculation of the load rate of the access point per type of application having regard to the request asking for broadcasting of the new application, the method which is the subject of the invention consists in executing a step E consisting in permitting respectively denying on the basis of priority rules associated with each type of application and as a function of the load rate of the access point, having regard to the request for the new application, the broadcasting of the new application on the access point $PA_j$ considered.

In FIG. 1, the step consisting in permitting respectively denying the broadcasting of the new application on the access point is represented by a test step E on the relation:

$$f(\tau_z(NM\_A_i,\overline{M\_PA}),PR)=\text{true?}$$

In the above relation, PR designates the set of priority rules associated with each type of application and $$\tau_z(NM\_A_i,\overline{M\_PA})$$

designates the load rate of the access point $PA_j$ for the newly requested application.

On positive response to the aforesaid test step E, the broadcasting of the new application requested by way of the access point $PA_j$ is then permitted in step F.

Conversely, on negative response to the test step on the aforesaid relation in step E, a denial step in step G is called, which is represented symbolically by the return to step B Deny and of course the return to the earlier state, that is to say to the previous broadcasting permission state disregarding the new requested application.

In a more specific manner, it is indicated that the measurement of the throughput of data transmitted per type of throughput application designated $D_k(T)$ is performed periodically with a period P at the level of the access point $PA_j$ considered. This measurement is performed by discriminating the types of application as a function of the index k designated as these latter and of course of the data types and data structures which travel through the access point during the broadcasting of the types of applications considered.

In a more particular manner, it is indicated that the measurement of the throughput of data transmitted per type of application is transmitted for the load rate calculation operation for the access point considered in the form of successive messages comprising at least the variables represented in table 1 hereinbelow.

TABLE 1

| | | |
|---|---|---|
| PA identifier | Pa$_j$ | Field identifying the Access Point in a unique manner in the local zone e.g. MAC address |
| Duration_Measurement | T | Duration of measurement: duration making it possible to take significant throughput measurements |
| Load_Channel | C_C | For each channel used: estimate of the level of use of the radio channel during the measurement period |
| For each mobile connected to the Access Point | | |
| NM_Address | NM_A$_i$ | Network address e.g. IP of the NM connected to the Access Point |
| NM_Modulation | NM_M | Modulation used by the Access Point during its last communication with the mobile node |
| For each type of application (e.g. for each queue of the Access Point): | | |
| Type_Service | T_S | Identifier giving the type of application e.g. Access Category in the case of an 802.11e Access Point |
| Modulation_PA | $\overline{M\_PA}$ | Average of the modulations used by the Access Point during the measurement period (i.e. average of the radio throughput) |
| Nb_Packet_Dispatched_TS | N_T_P$_k$ | Total number of packets dispatched to the NMs for this type of application during the measurement period |
| Nb_Packet_Received_TS | N_R_P$_k$ | Total number of packets received from the NMs for this type of application during the measurement period |
| Nb_Bytes_Dispatched_TS | N_T_B$_k$ | Total number of bytes dispatched to the NMs for this type of application during the measurement period |
| Nb_Bytes_Received_TS | N_R_B$_k$ | Total number of bytes received from the NMs for this type of application during the measurement period |
| Buffer_State_TS | | Size of the radio buffer for this type of application |
| Buffer_State_TS_Var | | Indicators of variation of the size of the buffer (memory) during the measurement period |
| Nb_Packet_Dropped_TS | | Number of packets dropped for this type of application |
| NM_Connected | | Number of NMs connected to the Access Point |
| Date Measurement | | Date of the measurement, makes it possible to disregard too old a measurement |
| Modulation_PAS_max | | Maximum modulation of the Access Point (i.e. maximum radio throughput) |
| Nb_Packet_Dispatched | | Total number of packets dispatched to the NMs during the measurement period |
| Nb_Packet_Received | | Total number of packets received from the NMs during the measurement period |
| Nb_Bytes_Dispatched | | Total number of bytes dispatched to the NMs during the measurement period |
| Nb_Bytes_Received | | Total number of bytes received from the NMs during the measurement period |
| Buffer_State | | Total size of all the radio buffers |
| Buffer_State_Var | | Indicators of variation of the total size of all the radio buffers during the measurement period |
| Nb_Packet_dropped | | Number of packets dropped |

With reference to the aforesaid table 1, it is indicated that the successive aforesaid messages comprise at least:

a unique identifier field of the access point in the local zone, that is to say in fact the MAC address of said point. This address corresponds to the address PA$_j$ previously mentioned in the description;

a field representative of the measurement period or measurement duration T and defined as the duration making it possible to take significant measurements of data transmission throughput through the access point PA$_j$;

a field representative, for each radio channel used, of the estimation of the level of use of this radio channel during the aforesaid measurement period;

For each mobile node connected to the access point PA$_j$ the successive messages furthermore comprise:

a field representative of the network address of the mobile node connected to the access point this field being denoted NM_A$_i$;

a field representative of the modulation mode used by the access point PA$_j$ during its last communication with the mobile node considered, this field being denoted NM_M.

For each type of application, the successive messages furthermore comprise as represented in the aforesaid table 1:

an application type identification field T_S, this field corresponding in fact to the designation of the access category in the case of an access point according to the previously mentioned 802.11e standard;

a field representative of the average of the modulations used by the access point during the measurement period for this type of application, this field comprises the variable $\overline{M\_PA}$, this variable designating in fact the average of the radio throughput transmitted by the access point PA$_j$;

a field representative of the total number of packets dispatched to the mobile node for this type of application during the measurement period, this field being denoted N_T_P$_k$;

a field representative of the total number of packets received from the mobile nodes for the type of application considered during the measurement period, this field being denoted N_T_R$_k$;

a field representative of the total number of bytes dispatched from the mobile nodes for this type of application during the measurement period, this field being denoted N_T_B$_k$;

and a field representative of the total number of bytes received from the mobile nodes for the type of application considered during the measurement period, this field being denoted N_R_B$_k$.

In addition to the fields previously cited, the successive messages can advantageously comprise the optional fields mentioned in table 1 in italics:

a field representative of the size of the radio buffer (memory) for the type of application considered;

a field representative of the indicators of variation of the buffer (memory) size during the measurement period;

a field representative of the number of rejected packets for the application or the type of application considered;

a field representative of the number of mobile nodes connected to the access point $PA_j$;

a field representative of the date of the measurement, so as to make it possible to disregard too old a measurement;

a field representative of the maximum modulation of the access point, that is to say of the maximum radio transmission throughput;

a field representative of the total number of packets dispatched to the mobile nodes during the measurement period;

a field representative of the total number of packets received from the mobile nodes during the measurement period;

a field relating to the total number of bytes dispatched to the mobile nodes during the measurement period;

a field relating to the total number of bytes received from the mobile nodes during the measurement period;

a field representative of the total size of all the radio buffers;

a field representative of the indicators of variation of the total size of all the radio buffers during the measurement period;

a field representative of the number of rejected packets.

Figure 2A:
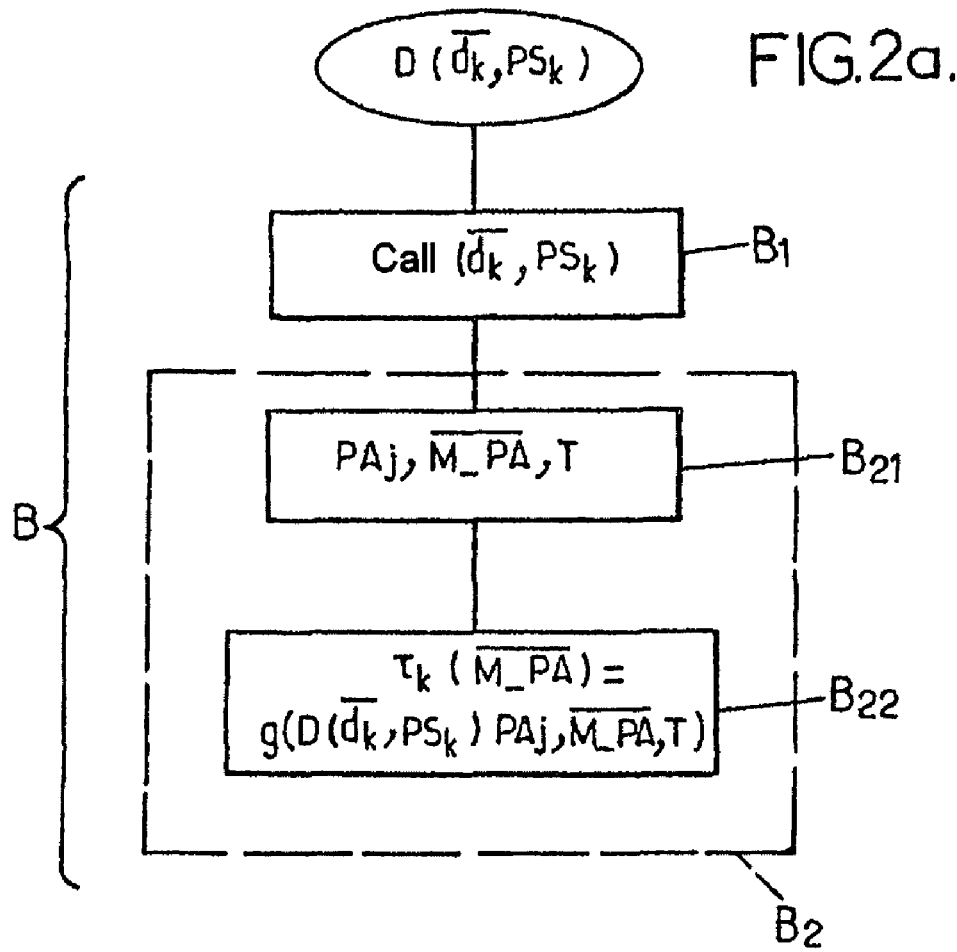
FIG. 2a represents, by way of illustration, a detailed flowchart for implementing the step of calculating the load rate of an access point per type of application, of FIG. 1.

A more detailed description of step B of calculating the load rate of the access point per type of application, on the basis of at least the network address of the mobile node and of the average throughput used between the access point and the mobile node considered, step B of FIG. 1, will be now given in conjunction with FIG. 2a.

In a particularly advantageous manner, the step consisting in calculating the load rate of the access point per type of application, in accordance with the subject of the present invention, can comprise the calling of stored pre-requested data and comprising at least average radio transmission times per type of application and the average size of the packets to ensure the broadcasting of the type of application considered.

In FIG. 2a, the calling step considered is denoted $B_1$ and the pre-requested data are denoted:

$$D(\overline{d_k}, \overline{PS_k})$$

In the aforesaid notation: $\overline{d_k}$ designates the average radio transmission times per type of application, and $\overline{PS_k}$ designates the average size of the packets transmitted, IP packets for example, to ensure the broadcasting of the type of application considered.

Step $B_1$ is then followed by a step $B_2$ consisting of an actual calculation and of the storage of an estimation value of the load rate of the access point $PA_j$ for the last measurement period, on the basis at least of the identifier of the access point $PA_j$ or address of the latter, of the average of the modulations used by the access point during the measurement period $\overline{M\_PA}$ and of the measurement period T defined as the duration making it possible to take significant throughput measurements. The three aforesaid variables identifying the access point $PA_j$, average of the modulations $\overline{M\_PA}$ and measurement period T are called in step $B_1$ of FIG. 2a so as in fact to perform the actual calculation in step $B_2$ on the basis of the aforesaid parameters.

Furthermore, and according to a characteristic of the method which is the subject of the present invention, for each mobile node, $NM_i$, the step of actual calculation and storage of an estimation value of the load rate comprises the storage and the reading of the modulation mode used by the access point during its last communication with the mobile node considered.

Thus, it is understood that, for the access point $PA_j$ considered, the reading of the network address of the mobile node in fact allows a one-to-one mapping of the address of the access point $PA_j$ and of the network address, IP address of the mobile node, address $NM\_A_i$, thereby making it possible to ensure fine location of the mobile node considered for the local implementation of the method which is the subject of the present invention at the level of the access point considered.

Furthermore, according to an advantageous mode of implementation of the method which is the subject of the present invention, the step of actual calculation and storage of an estimation value of the load rate for each type of application comprises the storage and reading of the variables such as described in table 2 hereinbelow.

TABLE 2

| | | |
|---|---|---|
| PA identifier | $Pa_j$ | Field identifying the Access Point in a unique manner in the local zone e.g. MAC address (cf. table 1) |
| Modulation_PA | $\overline{M\_PA}$ | Average of the modulations used by the Access Point during the measurement period (i.e. average of the radio throughput) - (cf. table 1) |
| Duration_Measurement | T | Duration of measurement: duration making it possible to take significant throughput measurements (cf. table 1) |
| For each mobile connected to the Access Point | | |
| NM_Address | $NM\_A_i$ | IP address of the $NM_i$ connected to the Access Point (cf. table 1) |
| NM_Modulation | NM_M | Modulation used by the Access Point during its last communication with the mobile node |
| For each type of service (e.g. for each queue of the Access Point): | | |
| Type_Service | T_S | Identifier giving the type of application (cf. table 1) e.g. Access |

TABLE 2-continued

| | | |
|---|---|---|
| TS_Service_Load | TS_S_C | Category in the case of an 802.11e Access Point Estimate of the load level of the Access Point during the last measurement period for a type of application |
| TS_Service_Load_Var | TS_S_C_V | Indicators of variation of the load of the Access Point between the last measurement and the previous measurement |
| Total_Service_Load | TS_C | Estimate of the total load level of the Access Point for all the applications during the last measurement period i.e. sum of all the TS_Service_Load |
| Total_Service_Load_variation | TS_C_V | Indicators of variation of the total load of the applications between the last measurement and the previous measurement |
| Load_Channel | C_C | For each channel used: estimate of the level of use of the radio channel during the last measurement (cf. table 1) |
| Load_Channel_Variation | C_C_V | Indicators of variation of the load of the channel between the last measurement and the previous measurement |
| NM_Connected | NM_N | Number of $NM_i$ connected to the Access Point (cf. table 1) |
| Date_Measurement | M_Date | Date of the measurement makes it possible to disregard too old a measurement (cf. table 1) |

The aforesaid variables comprise in particular:
the application type identifier $A_k$, designated T_S, that is to say an access category identifier when the access point is an access point managed by the 802.11e standard;
the estimation value of the load level of the access point $PA_j$ during the last measurement period for the type of application considered TS_S_C;
an indicator of variation of the load of the access point between the last measurement period and the previous measurement period TS_S_C_V;
an estimation value of the total load level of the access point $PA_j$ for the set of applications broadcast during the last measurement period, estimation value TS_C, this estimation value being able to correspond to the sum of the estimation of the load level of the access point for each type of application;
an indicator of variation of the total load of the applications between the last measurement period and the previous measurement period, indicator TS_C_V;
the number of mobile nodes NM_N connected to the access point $PA_j$ considered;
the date of the measurement period, M_Date, so as to make it possible to disregard too old a measurement.
For each broadcasting channel used, radio channel for example, are furthermore envisaged:
an estimation of the level of use of the broadcasting channel during the last measurement period, estimation denoted C_C;
an indicator of variation of the load of the broadcasting channel between the last measurement period and the previous measurement period, indicator denoted C_C_V.

By way of nonlimiting example, the estimation of the load level of the access point $PA_j$ for the last measurement period for a given type of application can be obtained through the ratio of an estimation of the data transmission time for the application concerned to the duration of the measurement.

The estimation of the data transmission time for the type of application considered can be obtained on the basis of the variables such as the total number of bytes received from the mobile nodes for the type of application considered during the measurement period, $N\_R\_B_k$, the total number of bytes dispatched to the mobile nodes, for this type of application during the measurement period, $N\_T\_B_k$, the total number of packets dispatched respectively received at the mobile nodes for the type of application considered during the measurement period, $N\_T\_P_k$ respectively $N\_R\_P_k$, the average of the modulations used by the access point considered $PA_j$ during the measurement period, that is to say the average of the radio throughput $\overline{M\_PA}$ as well as local variables at the access point considered $PA_j$, such as for example the average transmission time of the radio headers and the average size of the packets for the type of application considered.

Under these conditions, the indicator of load variation of the access point $PA_j$ between the last measurement and the previous measurement can be an indicator taking various values as a function of the direction of variation of the load of the access point considered for each type of application considered and as a function of the importance of this load variation.

A nonlimiting example of calculating the estimation of the load rate per application, variable TS_S_C of the aforesaid table 2, is indicated for a Best-Effort type of application or service according to the standard IEEE 802.11 b) and e)).

The value of the variable TS_S_C designates the numerical value of the load rate $\tau_k(\overline{M\_PA})$ calculated in step B of FIG. 1. This numerical value can be taken equal to $$TS\_S\_C = \frac{T_{AC} * 100}{T} \text{ where}$$

$$T_{AC} = \frac{Nb \text{ Bit}}{\overline{M\_PA}} + Nb \text{ packet} * (T_{SIFS} + T_{AIFS} + T_{pr} + T_{prh} + T_{back} + T_{ack})$$

In these relations:
$T_{AC}$ is an estimation of the data transmission time for the Best-Effort type of application or service, and T designates the duration of the measurement indicated in table 1;
$T_{SIFS}, T_{AIFS}, T_{pr}, T_{prh}, T_{back}$ and $T_{ack}$ are values contained in a configuration file contained in the database DBs, these values representing radio transmission times which depend on the type of application and the radio technology used;
Nb Bit=$(N\_T\_B_k+N\_R\_B_k)*8$;
Nb Packet=$(N\_T\_P_k+N\_R\_P_k)*8$;
$\overline{M\_PA}, N\_T\_B_k, N\_R\_B_k, N\_T\_P_k$ and $N\_R\_P_k$ are designated in table 1.

The load rate per application $\tau_k(\overline{M\_PA})$=TS_S_C is therefore an estimation of the occupancy rate of the radio channel for a type of application or service.

Indicator values of the direction of variation of the load rate per type of application or service, TS_S_CV designated in table 2, can be calculated according to the distribution hereinbelow:

| Variation | TS_S_CV |
|---|---|
| Stable | 0 |
| Load moderately increasing | 1 |
| Load strongly increasing | 2 |
| Load moderately decreasing | 3 |
| Load strongly decreasing | 4 |

During the occurrence of a new application or service request, step C of FIG. 1, the step of calculating the added load can be executed, by way of nonlimiting example, in the manner hereinbelow.

The load added by the new service $$N\_S\_C = \tau_2(NM\_A_i, \overline{M\_PA}) - \tau_k(\overline{M\_PA}) = \frac{R\_RS_k + H\_R}{NM\_M}$$

In the above relation
$R\_RS_k$ designates the throughput required for the new application or service requested, cf. table 2 the corresponding value is provided by the application server SA; H_R designates the header throughput with $$H\_R = H\_R = \frac{R\_RS_k}{P\_S} * H\_N$$

where
P_S designates the size of the data packets, value configured locally for a type of application or service
H_N: at the network head, designates the number of bits added at the network head, under the service layer, as MAC, IP and UDP or TCP head.

A nonlimiting example of applying the priority rules PR, that is to say in fact of executing step E of FIG. 1, will now be given in conjunction with FIG. 2b.

Figure 2B:
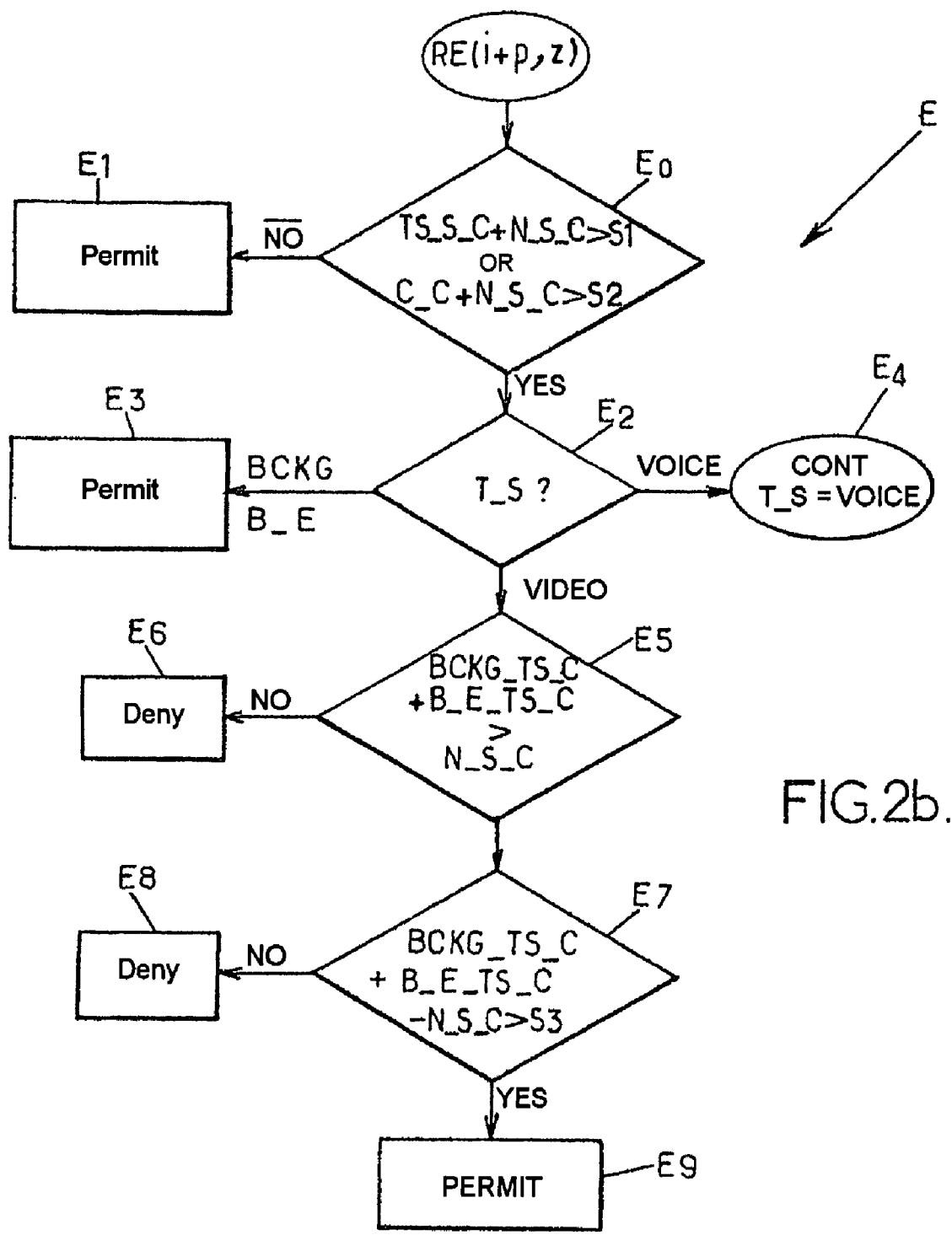
FIG. 2b represents, by way of illustration, a detailed flowchart of the test of step E and of the application of the priority rules, in the case of an Best Effort application or service according to the standard 802.11 b) and e)

FIG. 2b corresponds to the situation according to which a request for a new application RE(i+p, z) is introduced.

In the example of FIG. 2b, a new application corresponding to a type of video service is accepted if the background traffic BCKG and Best Effort traffic B_E defined according to the aforesaid IEEE 802.11 standard can support a sufficient reduction in bandwidth, that is to say in throughput without descending below a certain predefined threshold which can be taken equal to 10%.

The process for verifying the rules PR of step E is then applied under the conditions hereinbelow.

If the new requested application brings about a service load of the access point considered that is greater than a predefined threshold value denoted $S_1$, $S_1$ taken equal to 80% for example or if the requested application brings about a channel load that is greater than a predefined threshold value $S_2$, for example 100%, then on negative response to the inequalities hereinbelow:

$TS\_S\_C+N\_S\_C>S_1$

OR $C\_C+N\_S\_C>S_2$ the existing types of service are discriminated, these types of service being in the example given equal to 4 and designated by Background, Best-Effort, video and voice with reference to the designation of the aforesaid IEEE 802.11 standard.

On negative response to the inequalities of step 0 of FIG. 2b then a step $E_1$ is called which corresponds to permission for the broadcasting of the application or service requested.

Conversely, on positive response to one of the aforesaid inequalities, a step $E_2$ is called which consists in discriminating the type of service actually requested. This discrimination is denoted

TS?

In step $E_0$ the variables TS_S_C and C_C are defined in table 2 previously indicated in the description. The variable N_S_C is that which has been previously defined as additional load requested by the new service.

When in response to the test $E_2$ the application or service requested corresponds either to an application of Background type BCKG or of Best-Effort type B_E, then a step 3 is called which corresponds to permission for the requested application.

If the application type discriminated in step 2 corresponds to the voice type, then a step $E_4$ is called which corresponds to a string of processings for an application of voice type.

If ultimately the type of application or service discriminated is of video type in response to the test of step $E_2$ then a step $E_5$ is called involving the values of the variable TS_S_C designated in table 2 for an application or service of Background type, variable designated BCKG_TS_C, respectively for a Best-Effort type of application or service variable designated B_E_TS_C.

The test of step $E_5$ then consists in verifying the inequality:

$BCKG\_TS\_C+B\_E\_TS\_C>N\_S\_C$

On negative response to the aforesaid inequality, a denial step $E_6$ is called the new requested application not being subjected to broadcasting.

Conversely, on positive response to the aforesaid inequality in step $E_5$, a test step $E_7$ is called which then consists in evaluating the difference of the sum of the new loads BCKG_S_C+B_E_S_C and of the extra load of the new application NSC in relation to the threshold $S_3$ previously mentioned. The aforesaid threshold $S_3$ is taken equal to 10% for example.

On negative response to the test $E_7$, the inequality $$BCKG\_TS\_C+B\_E\_TS\_C-NSC>S_3$$

not being satisfied, a denial step $E_8$ is called, the new requested application not being broadcast.

Conversely, on positive response to the aforesaid inequality in step $E_7$, then a step $E_9$ of permitting the broadcasting of the new requested application is then called.

In the aforesaid example illustrated in conjunction with FIG. 2b, it is understood that the final decision taken in the test of step $E_7$ makes it possible to accept the new application request since even if the access point $PA_j$ is loaded, the services of Best-Effort and Background type experience an acceptable bandwidth or throughput fallback.

A more detailed description of a system for locally controlling the broadcasting of an application at the level of an access point of a shared wireless network, in accordance with the subject of the present invention, will now be given in conjunction with FIGS. 3a and 3b.

Figure 3B:
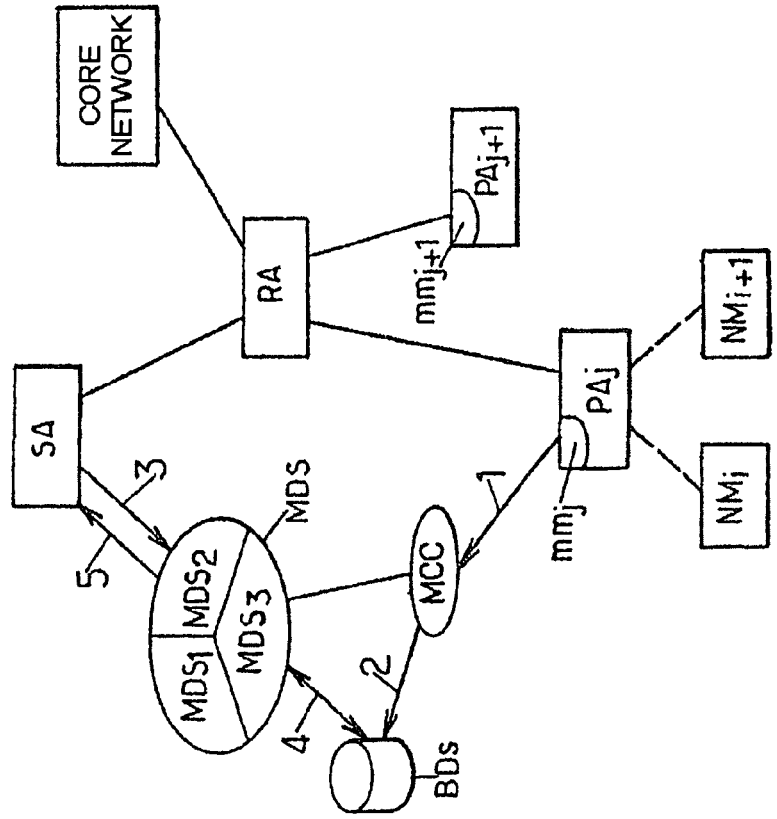
Figure 3A:
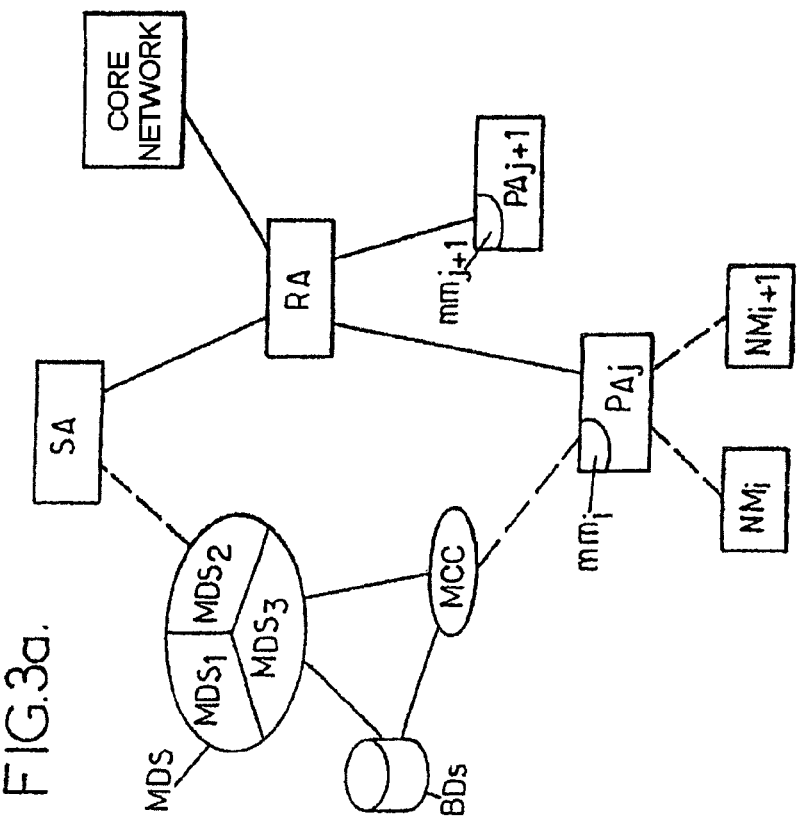
FIG. 3a represents, by way of illustration, the diagram of a system for locally controlling the broadcasting of an application on a shared wireless network, in accordance with the subject of the present invention.

Represented in FIG. 3a, in block diagram form, is a system for controlling the broadcasting of an application in accordance with the subject of the present invention. A plurality of mobile nodes $NM_i$, $NM_{i+1}$ is connected to an access point $PA_j$ for example, each mobile node being tagged by a network address as previously mentioned in the description. The network address of each mobile node is understood to be the IP address for example. The network, such as a network of IP type, comprises an applications server SA making it possible to broadcast a plurality of applications invoked on request by one or more of the aforesaid mobile nodes.

Each access point $PA_j$, $PA_{j+1}$ is interconnected to the core network and to the applications server SA.

The applications server SA manages one or more applications invoked by one or more of the mobile nodes. It may be local to the zone or situated in the core network for example.

The system which is the subject of the invention comprises at least, connected to the application server SA and to the aforesaid access points $PA_j$, $PA_{j+1}$, an applications database denoted $BD_s$ containing a set of data relating to the types of applications $A_k$ and of course to the aforesaid access points $PA_j$ and $PA_{j+1}$. The information contained in the database $BD_s$ comprises for example information such as an identifier or address of the access point of the zone $PA_j$, a network identifier of the mobile nodes present on each access point, that is to say their addresses $NM\_A_j$, the types of applications used, $A_k$, the characteristics of these types of applications such as reliability of the measurements or the like.

As furthermore represented in FIG. 3a, the system which is the subject of the invention comprises a module for calculating the load rate per type of application, module denoted MCC in the aforesaid figure, this module being interconnected to the applications database $BD_s$ and allowing the collection and the transmission of data relating to the applications and the updating of the application database $BD_s$ on the basis of the latter.

In a general manner, it is indicated that the module MCC is formed by a logic entity which can be integrated into the applications server SA, into a zone router RA represented in the drawing, into the access point $PA_j$ or ultimately into any entity of the specific network.

The system which is the subject of the invention also comprises a module MDS for controlling, on the access point considered $PA_j$, the broadcasting of the application requested in conjunction with the application server SA, the control module MDS making it possible to ensure control of broadcasting by permission respectively denial on the basis of priority rules PR associated with each type of application, as a function of the load rate and/or of the variation in the load rate of the access point for any request for broadcasting a new application.

In a general manner, it is indicated that the module for controlling the broadcasting of the requested application MDS consists of a logic entity which can be integrated into the applications server SA or into the load calculation module MCC for example.

The module for controlling the broadcasting of the requested application is interrogated by the applications server SA so as to render a decision relating to the admission control of an application as a function of the load existing for the access point considered $PA_j$. It integrates, on the one hand, decision logic fed on the one hand with the information relating to the application requested by one of the connected mobile nodes, the information provided by the applications server SA, and, on the other hand, the data table $BD_s$ as regards the information relating to the application load of the access points. The module for controlling broadcasting consults the application database $BD_s$.

Finally, the access router RA ensures the connection between the mobile nodes $NM_i$ and the core network by way of the access points, such as the access point $PA_j$.

The aforesaid access points ensure the attachment by radio link of the mobile nodes $NM_i$ and are connected to the access router RA for example.

Within the framework of the implementation of the system which is the subject of the invention and of the method which is the subject of the invention, the access points $PA_j$ ensure the collection of radio/applications information which is dispatched to the module for controlling the broadcasting of the requested application MDS either directly, or by way of other network entities such as the access router RA for example.

Furthermore, within the framework of the implementation of the method and of the system which are the subject of the invention, an access point $PA_j$, can be configured so as to ensure, not only the attachment of each mobile node considered $NM_i$, but also the monitoring of the radio channels so as to collect the radio/applications information of any adjacent access point $PA_{j+1}$ for example.

Finally, as represented in FIG. 3a, each access point $PA_j$ comprises a module for measuring and collecting data mmj relating to radio broadcasting and to each application able to be broadcast by the corresponding radio channel.

With reference to FIG. 3a, the module for controlling the broadcasting of the requested application, MDS, comprises at least one first module MDS1 for discriminating on the basis of the data contained in the applications server SA, as a function of the network address of the mobile node, $NM\_A_j$, the access point $PA_j$ to which the mobile node is connected and also the modulation mode used by the access point during its last communication with the aforesaid mobile node.

It is indicated that the discrimination of the access point $PA_j$ to which the mobile node is connected can be carried out on the basis of the one-to-one mapping previously mentioned in the description. As regards the last modulation used by the access point, to communicate with the mobile node considered, it is indicated that this parameter is contained in table 2 and designated NM_M.

With reference to the same FIG. 3a, it is indicated that the control module MDS furthermore comprises a module MDS2 for numerically calculating an estimation value of the load added by the new requested application. This estimation value can be calculated owing to the broadcasting throughput required for the new requested application $A_{k+1}$ and to the modulation mode used to communicate with the mobile node $NM_{i+p}$ requesting this new application. The modulation mode corresponds to the parameter NM_M of table 2.

Thus, the discriminating module $MDS_1$ makes it possible to establish and ascertains a set of data comprising at least one estimation of the new load for the new requested application, the identifier of the access point $PA_j$ considered called to support this new load, the specific load of the radio broadcasting channel having to support this new load, the type of application used to transmit this new requested application and the estimation of the load level of the access point for the type of application requested.

The control module MDS finally comprises a logic module $MDS_3$ for interpreting associated internal priority rules PR for each type of application and for calculating a decision of permission respectively denial of the broadcasting of the new requested application as a function of the load rate and/or of the channel load and of the load rate of the permitted types of applications of the access point $PA_j$.

On reception by the application server SA of a request for broadcasting a new application by a determined mobile node, the request $RE_{(i+p,z)}$ of FIG. 1, the application server SA executes with the module for controlling the broadcasting of the requested application MDS, an interactive message exchange protocol comprising at least the transmission, by the application server SA to the control module MDS, of a message requesting permission for broadcasting the new requested application. The broadcasting permission request message contains at least, in addition to a request message identifier RE, an identifier of the type of the new requested application $S_k$ and a variable representative of the data transmission throughput required for the broadcasting of this new application $R\_RS_k$. The aforesaid parameters are represented in table 3.

TABLE 3

| NM_Address | | Network address of the NM requesting the new application |
|---|---|---|
| Message identifier | REI | Identifies the request message |
| Application | $S_k$ | Application or type of application requested by the NM |
| Throughput_Service_Requested | $R\_RS_k$ | Throughput required for this new application |
| Acceptable service throughput | | Acceptable throughput for this new application |
| Requested service jitter | | Requested service jitter for this new application |
| Acceptable service jitter | | Acceptable service jitter for this new application |
| Requested service lag | | Requested service lag for this new application |
| Acceptable service lag | | Acceptable service lag for this new application |
| Requested packet loss rate | | Requested packet loss rate for this new application |
| Acceptable packet loss rate | | Acceptable packet loss rate for this new application |

The broadcasting permission request message can furthermore comprise, as represented in the aforesaid table in italics, a parameter of acceptable throughput for the new requested application, a parameter of requested application jitter for this new application, a parameter of acceptable application jitter for this new application, a parameter of requested service lag for this new application, a parameter of acceptable application lag for this new application, a parameter of packet loss rate for the new requested application and a parameter of acceptable packet loss rate for this new application.

The interactive message exchange protocol between the application server SA and the module for controlling the broadcasting of the requested application MDS, furthermore comprises the transmission, by the module for controlling the broadcasting of the requested application MDS to the application server SA, of a response message containing at least one identifier of the request message to which this response message responds, that is to say the identifier REI of table 3 and a response variable whose adoption of the value true permits the broadcasting and whose absence of the adoption of the value true denies the broadcasting of the new application requested by the application server SA.

The aforesaid parameters are represented in table 4, in which Re designates the response parameter of the decision module DMS, the broadcasting of the application then being accepted or rejected.

TABLE 4

| NM_IP_Address | $NM\_A_i$ | Network address of the NM requesting the new service |
|---|---|---|
| Message identifier | REMI | Identifies the request message to which this message responds |
| Response | Re | Response of the Service Decision Module: service accepted or denied |
| Desirable service throughput | | Desirable throughput for this new service |
| Desirable service jitter | | Desirable jitter for this new service |
| Desirable service lag | | Desirable lag for this new service |
| Desirable packet loss rate | | Desirable packet loss rate for this new service |

The aforesaid response message can furthermore comprise, as represented in table 4 in italics, a parameter of desirable transmission throughput, of desirable jitter, of desirable lag and of desirable packet loss rate for the new requested application.

The operation of the system for locally controlling the broadcasting of an application at the level of an access point of a shared wireless network, which is the subject of the present invention, is then represented hereinbelow.

In relation to the aforesaid FIG. 3b, the operational mode of the system which is the subject of the invention is the following: the operating process consists in uploading from the access point $PA_j$ to the load calculation module MCC the following information:
 the identification of the access point;
 the network addresses of the connected mobile nodes and the radio throughput of each connected mobile;
 the average throughput per application type used between the access point and the mobile nodes;
 the period used for the measurement of this throughput;
 and of course the measurements of throughput per type of application.

The module for calculating the load MCC can then deduce therefrom the load rate of the access point $PA_j$ considered per type of application $A_k$.

The module for controlling broadcasting MDS as a function of the aforesaid load and of priority rules associated with each type of application $A_k$ is then able to define, for a new application requested by a mobile node, whether or not the latter is accepted on the access point $PA_j$ considered.

To implement the aforesaid operational mode, the protocol for exchanging messages between the various elements of the system which is the subject of the invention, such as represented in FIG. 3b can be the following:

1) Periodically the access point $PA_j$ provides the load calculation module MCC with the information relating to the type of application which is traveling through the access point $PA_j$. This gives rise for example to network or radio measurements relating to queues present in the access point, the aforesaid queues comprising for example the references of the types of successively requested applications.

2) The load calculation module MCC updates the database $DB_s$ by providing information communicated by the access points $PA_j$. On the basis of the aforesaid information and of locally available information, such as for example priority rules PR defined by the network operator during configuration of the access points, the load calculation module MCC calculates and transmits in the database estimations of load rate of the access point per type of application. The locally available information makes it possible for example to establish the correspondence between the types of application, types such as real-time application, non real-time application, and the queues of the access points.

3) During receipt of a service request, the application server interrogates the broadcasting control module MDS to ascertain whether the access point $PA_j$ to which the client is connected, that is to say the terminal $NM_{i+p}$ requesting the new application, has the possibility of transmitting this new application.

The applications server SA passes, in its request, information making it possible to identify the requesting terminal or mobile node $NM_{i+p}$ and to characterize the type of application.

4) The broadcasting control module MDS consults the load state per type of service of the access point $PA_j$ to which the requesting terminal $NM_{i+p}$ is connected. This access point is known by virtue of the access point identifier $PA_j$/network of the mobile node identifier $NM\_A_i$ one-to-one mapping contained in the database $BD_s$. Through its internal decision algorithm, the broadcasting control module MDS renders an arbitration permitting or otherwise the broadcasting of the application and of the requested service.

5) The response of the broadcasting control module MDS is then returned to the application server SA.

In practice, it is indicated that the implementation of the method and of the system which are the subject of the present invention is based on the IPv4 protocol for exchanging messages between constituent entities of the aforesaid system, these entities being of course connected as a network and the protocol for managing access points on a shared wireless network of the 802.11e type.

The service load calculation module MCC and the broadcasting control module MDS form a set of scripts executed by a server.

In particular, the broadcasting control module comprises a software or program module for interpreting rules of internal priority associated with each type of executable application and for calculating a decision permitting respectively denying, as a function of the load rate of an access point, the broadcasting of a requested application.

The access point $PA_j$ and the module for calculating loads MCC communicate by way of the SNMP protocol for example.

The application server SA and the broadcasting control module communicate in an advantageous manner via the RADIUS protocol for example.

The various aforesaid protocols will not be described in detail since they belong to the state of the art.

Figure 4:
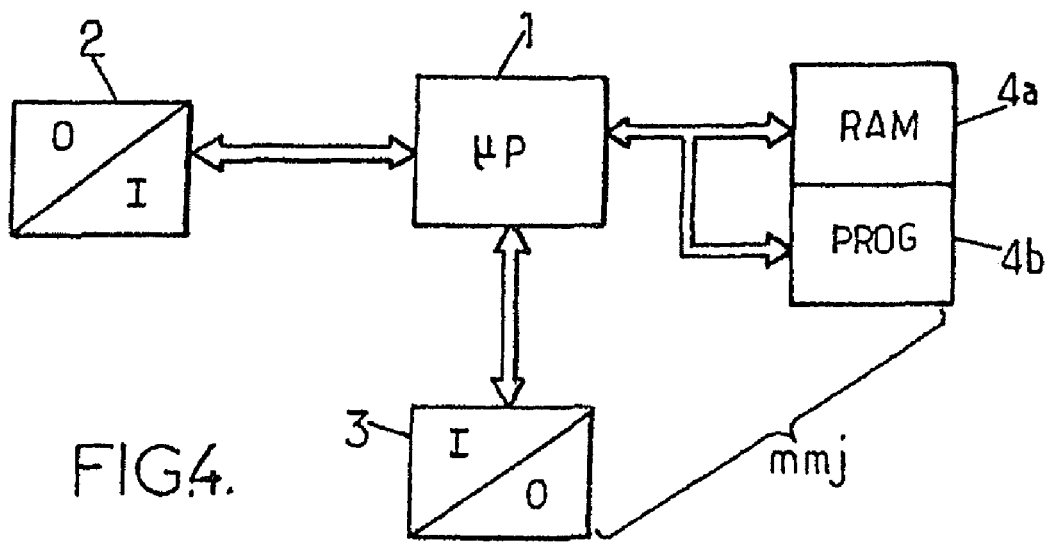
FIG. 4 represents, by way of illustration, the specific architecture of an access point allowing the implementation of the method and of the system for locally controlling the broadcasting of an application on a shared wireless network.

Finally, with reference to FIG. 4, it is indicated that in order to allow the implementation of the method and of the system which are the subject of the invention, any access point $PA_j$ is furnished with a microprocessor 1 and input output facilities 2, 3 of IP and radio type, as well as with a RAM work memory 4a and a program memory PROG 4b. The whole set constitutes resources for measuring mmj, storing and transmitting values of throughput measurement per type of application and of the average of radio throughputs $\overline{M\_PA}$ per type of application to the database DBs.

The invention claimed is:

1. A method for locally controlling the broadcasting of an application at the level of an access point of a shared wireless network, to which is connected at least one mobile node, tagged by a network address, for said access point, the method comprising:

measuring the throughput of data transmitted per type of application;

calculating the load rate of this access point per type of application, on the basis of at least the average throughput used between said access point and said at least one mobile node; and permitting respectively denying, on the basis of priority rules associated with each type of application, as a function of said load rate of this access point, for any request for broadcasting a new application, the broadcasting of this new application on this access point.

2. The method as claimed in claim 1, wherein the measuring the throughput of data transmitted per type of application is performed periodically at the level of said access point, by discriminating the types of applications and the types of data which travel through said access point.

3. The method as claimed in claim 2, wherein the measuring the throughput of data transmitted per type of application is transmitted for the load rate calculation operation for this access point, in the form of successive messages comprising:

a unique identifier field of said access point in the local zone;

a field representative of the measurement period; and a field representative, for each radio channel used, of the estimation of the level of use of said radio channel during said measurement period.

4. The method as claimed in claim 3, wherein for each mobile node connected to said access point, said successive messages further comprise:

a field representative of the network address of the mobile node connected to said access point; and a field representative of the modulation mode used by said access point during its last communication with said mobile node.

5. The method as claimed in claim 3, wherein for each type of application, said successive messages furthermore comprise:

a field representative of an application type identifier;

a field representative of an average of the modulations used by said access point during the measurement period;

a field representative of a total number of packets dispatched to the mobile nodes for this type of application during the measurement period;
a field representative of a total number of packets received from the mobile nodes for this type of application during the measurement period;
a field representative of a total number of bytes dispatched to said mobile nodes for this type of application during the measurement period; and
a field representative of a total number of bytes received from said mobile nodes for this type of application during the measurement period.

6. The method as claimed in claim 5, wherein the step of calculating the load rate of this access point per type of application comprises:
the calling of stored pre-requested data comprising at least average radio transmission times per type of application and the average size of the packets so as to ensure the broadcasting of said type of application, and
the actual calculation and the storage of an estimation value of the load rate of this access point for the last measurement period, on the basis at least of the identifier of said access point, of the average of the modulations used by said access point for the measurement period and of the measurement period defined as the duration making it possible to take significant throughput measurements.

7. The method as claimed in claim 6, wherein for each mobile node, the step of actual calculation and storage of an estimation value of the load rate comprises the storage and the reading of the modulation mode used by said access point during its last communication with said mobile node.

8. The method as claimed in claim 6, wherein for each type of application, the step of actual calculation and storage of an estimation value of the load rate comprises the storage and the reading of:
the application type identifier;
the estimation value of the load level of said access point during the last measurement period for said type of application;
an indicator of variation of the load of said access point between the last measurement period and the previous measurement period;
an estimation value of the total load level of said access point for the set of applications broadcast during the last measurement period;
an indicator of variation of the total load of the services between the last measurement period and the previous measurement period;
the number of mobile nodes connected to said access point;
the date of the measurement period, and for each broadcasting channel used;
an estimation of the level of use of said broadcasting channel during the last measurement period;
an indicator of variation of the load of said broadcasting channel between the last measurement period and the previous measurement.

9. A system for locally controlling the broadcasting of an application at the level of an access point of a shared wireless network, to which is connected at least one mobile node, tagged by a network address, said network comprising an applications server making it possible to broadcast a plurality of applications invoked on request by a mobile node, each access point being interconnected to the core network of said network and to said applications server, the system being interconnected to said applications server and to said access points, the system comprising:
an applications database, containing a set of data relating to said applications and to said access points;
a means for calculating, for said access point, the load rate per application, interconnected to said applications database, said means for calculating the load rate per application allowing the collection and the transmission of data relating to the applications and the updating of said applications database on the basis of the latter; and
means for controlling, for said access point, the broadcasting of the application requested in conjunction with said applications server and making it possible to ensure the controlling of the broadcasting, by permission respectively denial, on the basis of priority rules associated with each type of application, as a function of the load rate and/or of the variation in the load rate of said access point, for any request for broadcasting a new application.

10. The system as claimed in claim 9, wherein said access points comprise means for measuring and collecting data relating to radio broadcasting and to each application able to be broadcast by the corresponding radio channel.

11. The system as claimed in claim 9, wherein said means for controlling the broadcasting of the requested application comprise:
means for discriminating, on the basis of data contained in said applications database, as a function of the network address of said mobile node, the access point to which said mobile node is connected and the modulation mode used by said access point during its last communication with said mobile node;
means for numerically calculating an estimation value of the load added by the new requested application, said estimation value of the added load being calculated owing to the broadcasting throughput required for said new requested application and of the modulation mode used to communicate with said mobile node, said discriminating means making it possible to establish a set of data comprising:
an estimation of the new load for the new requested application,
the identifier of the access point considered called to support this new load,
the specific load of the radio broadcasting channel having to support this new load,
the type of application used to transmit this new requested application,
the estimation of the load level of said access point for the type of application requested, and
logic means for interpreting associated rules of internal priority for each type of application and for calculating a decision of permission respectively denial, as a function of the load rate of said access point and/or of the channel load and of the load rate of the permitted types of application, of the broadcasting of the new requested application.

12. The system as claimed in claim 9, wherein on receipt by said applications server of a request for broadcasting a new application by a determined mobile node, said applications server executes with said means for controlling the broadcasting of the requested application an interactive message exchange protocol, comprising:
the transmission, by said applications server to said means for controlling the broadcasting of the requested application, of a message requesting permission for broadcasting said new requested application, containing at least, in addition to a request message identifier, an identifier of the type of the new requested application and a variable representative of the data transmission throughput required for the broadcasting of this new application; and the transmission, by said means for controlling the broadcasting of the requested application to said applications server, of a response message containing at least one identifier of said request message to which this response message responds and a response variable whose adoption of the value true permits the broadcasting, and whose absence of adoption of the value true denies the broadcasting, of said new application requested by said applications server.

13. An applications server at the level of an access point of a shared wireless network, to which is connected at least one mobile node, tagged by a network address, characterized in that, on receipt by said applications server of a request for broadcasting a new application sent by a determined mobile node, said applications server executes in conjunction with means for controlling the broadcasting of the requested application an interactive message exchange protocol comprising:

the transmission, by said applications server to said means for controlling the broadcasting of the requested application, of a message requesting authorization for broadcasting said new requested application, containing at least, in addition to a request message identifier, an identifier of the type of the new application requested and a variable representative of the data transmission throughput required for the broadcasting of this new application;

the transmission, by said means for controlling the broadcasting of the requested application to said applications server, of a response message containing at least one identifier of said request message to which this response message responds and a response variable whose adoption of the value true permits the broadcasting, and whose absence of adoption of the value true denies the broadcasting, of said new application requested by said applications server.

* * * * *